(12) United States Patent
Alexander et al.

(10) Patent No.: US 8,910,257 B2
(45) Date of Patent: Dec. 9, 2014

(54) REPRESENTING SECURITY IDENTITIES USING CLAIMS

(75) Inventors: Jan Alexander, Duvall, WA (US); Christopher G. Kaler, Sammamish, WA (US); Charles R. Reeves, Snohomish, WA (US); Hervey O. Wilson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 654 days.

(21) Appl. No.: 12/485,859

(22) Filed: Jun. 16, 2009

(65) Prior Publication Data

US 2010/0001833 A1    Jan. 7, 2010

Related U.S. Application Data

(60) Provisional application No. 61/078,673, filed on Jul. 7, 2008.

(51) Int. Cl.
*H04L 29/06* (2006.01)
*G06F 21/33* (2013.01)

(52) U.S. Cl.
CPC ............ *H04L 63/08* (2013.01); *G06F 21/33* (2013.01)
USPC .......................................................... 726/6

(58) Field of Classification Search
None
See application file for complete search history.

(56) References Cited

U.S. PATENT DOCUMENTS

| | | |
|---|---|---|
| 2003/0074579 A1 | 4/2003 | Della-Libera et al. |
| 2004/0015596 A1* | 1/2004 | Sapuram et al. ............ 709/230 |
| 2004/0034797 A1 | 2/2004 | Becker Hof |
| 2004/0230831 A1* | 11/2004 | Spelman et al. ............ 713/201 |
| 2005/0223413 A1* | 10/2005 | Duggan et al. ............... 726/3 |
| 2005/0283614 A1* | 12/2005 | Hardt ............................ 713/182 |
| 2006/0021019 A1 | 1/2006 | Hinton et al. |
| 2007/0094400 A1 | 4/2007 | Childress |
| 2007/0118886 A1 | 5/2007 | Martin |
| 2007/0143835 A1 | 6/2007 | Cameron |
| 2007/0150935 A1 | 6/2007 | Satoh |
| 2007/0204325 A1 | 8/2007 | Cameron |
| 2008/0066159 A1* | 3/2008 | Dillaway et al. ............. 726/4 |
| 2008/0127320 A1* | 5/2008 | De Lutiis et al. ............ 726/9 |
| 2008/0263644 A1* | 10/2008 | Grinstein ........................ 726/6 |

FOREIGN PATENT DOCUMENTS

| | | |
|---|---|---|
| CN | 1852150 | 10/2006 |
| JP | 20051519365 A | 6/2005 |
| WO | 2007/068716 | 6/2007 |
| WO | 2008/031043 | 3/2008 |
| WO | 2008/042914 | 4/2008 |

OTHER PUBLICATIONS

"International Search Report", Mailed Dec. 29, 2009, Application No. PCT/US2009/048893, Filed Date Jun. 26, 2009, pp. 1-12.

(Continued)

*Primary Examiner* — David Pearson
(74) *Attorney, Agent, or Firm* — Henry Gabryjelski; Kate Drakos; Micky Minhas (57) ABSTRACT

The claims based identity model provides a model which associates security identities with claims. The model represents information contained in the claims, as well as, captures relationships between the security identities described in the claims. Finally, the data model can be easily translated to the existing .NET environment without breaking the backward compatibility for existing .NET applications.

19 Claims, 5 Drawing Sheets

(56) References Cited

OTHER PUBLICATIONS

"Security Briefs"; accessed at http://msdn.microsoft.com/en-us/magazine/cc163366(printer).aspx; Microsoft Corporation; downloaded Jul. 16, 2008; 6 pages.
Brown, K.; "Microsoft Code Name 'Zermatt' white paper for developers"; Pluralsight, LLC; 2008; 33 pages.
Bustamente, M.L.; "Building a Claims-Based Security Model in WCF—Part 2"; TheServerSide.Net; May 24, 2007; 15 pages.
"Technical features new to Windows Vista"; Wikipedia.org; downloaded Jul. 16, 2008; 13 pages.
Tay, W.; "Web Services Security: Tracking Through the Standards Jungle"; Fwsi.org; Oct. 21, 2005; 16 pages.
CN Patent Application 200980126782.0; First Office Action dated Dec. 17, 2012; 11 pages.
CN Patent Application 200980126782.0; Response to First Office Action dated Dec. 17, 2012 filed Jan. 8, 2013; 11 pages.
CN Patent Application 2009801267820; Notice of Allowance with Allowed Claims dated May 28, 2013; 5 pages.
JP Patent Application 2011-517472; First Office Action dated Dec. 25, 2013; 4 pages.

* cited by examiner

REPRESENTING SECURITY IDENTITIES USING CLAIMS

BACKGROUND

Most current enterprise security infrastructure is designed to discriminate users accessing resources in the same security domain (e.g. Active Directory Trust Domains). In this environment, symmetric key protocols, such as Kerberos, are used to communicate with a Key Distribution Center (KDC) to establish and verify credentials that are exchanged between clients and servers hosting protected information within the domain. Servers evaluate these credentials relative to access control lists associated with each protected resource to determine access. When the client and servers are located in distinct security domains, this model cannot function as a single KDC does not exist. Instead, a federated model must be used where points of trust are established in each domain to generate (and potentially verify) authoritative statements of identity for applications and users requesting access to resources in foreign security domains. This federated model, as described in more detail herein is supported and embraced by many public specifications including WS-Trust, WS-Federation, and Security Assertion Markup Language (SAML).

In view of the foregoing, there is a need for a system and method that overcomes the drawbacks of the prior art and enables systems to affect access control across security domains.

SUMMARY

The following presents a simplified summary of the disclosure in order to provide a basic understanding to the reader. This summary is not an extensive overview of the disclosure and it does not identify key/critical elements. Its sole purpose is to present some concepts disclosed herein in a simplified form as a prelude to the more detailed description that is presented later.

The identity of a subject may be expressed as a set of claims. A claim is an attribute associated with a subject asserted by an issuer. A digital identity is a set of claims made by a digital entity about itself or another digital subject. Claims are the fundamental element of a claim based security scheme. The claim based data model has as its primary elements, the claims, the claims identity and the claims principal. The claims model, in some embodiments described herein, enables modeling the security identity to act as another security identity. The length of the identity delegation chain for a security identity can be arbitrary. Finally, the claim based security scheme can be integrated into the existing .NET identity model.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Identity authentication systems and protocols allow computer networks across various domains and platforms to authenticate users and allow those users access to the various resources stored on the networks. The data model provided in the detailed description and associated drawing figures allow representing the identities as a set of claims, abstracting away the authentication mechanism that was used to authenticate the identity. The model represents information contained in the claims, as well as, captures relationships between the security identities described with the claims. Finally, the data model can be translated into the set of common runtime language (CLR) classes to enable access to the claims based mode from .NET environment. In addition, the translation integrates with the claims-based identity model with the existing .NET identity model while keeping the backward compatibility so that existing .NET applications can be used with new claims-based identity model without having to re-implement them.

Figure 1:
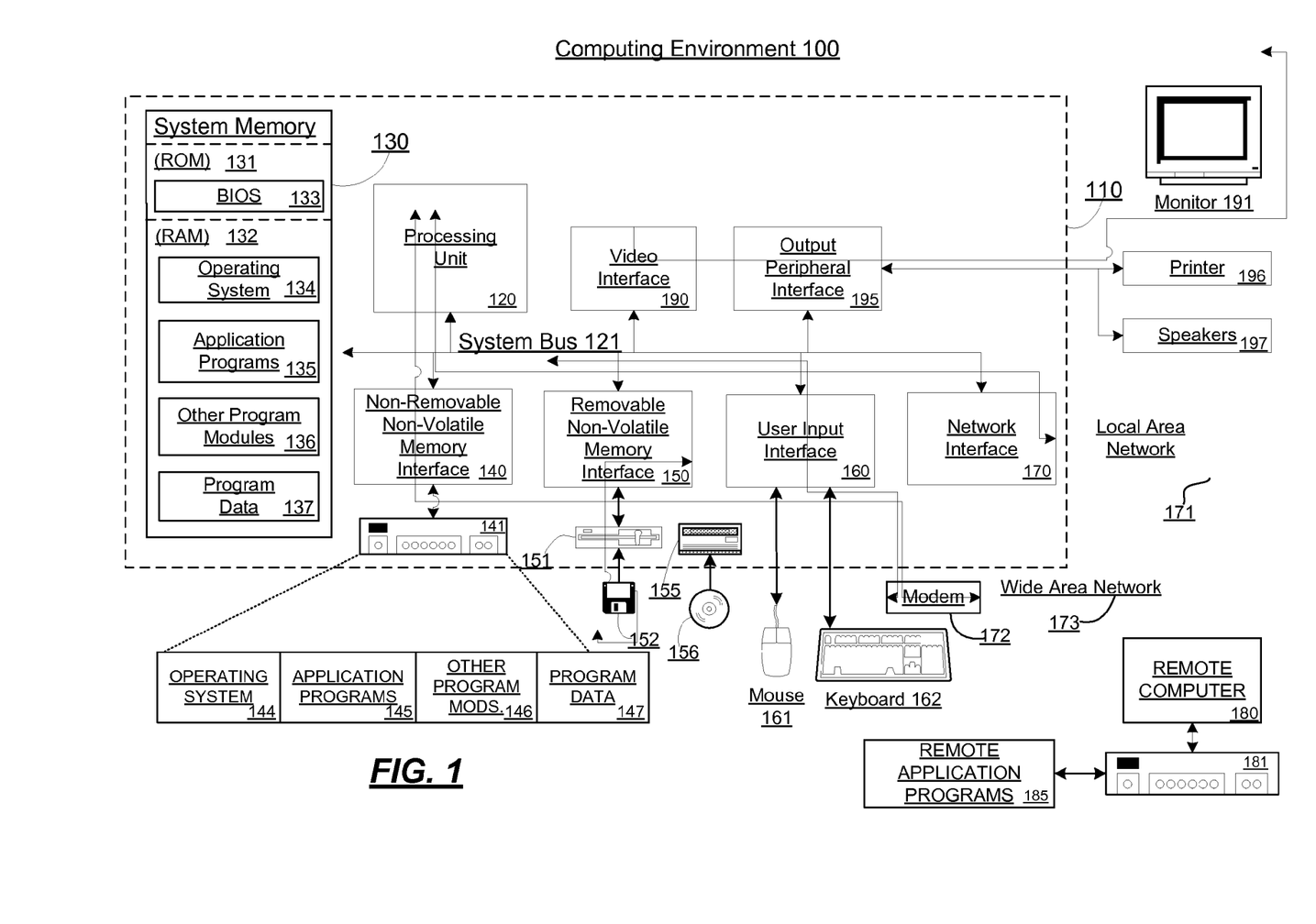
FIG. 1 is a block diagram of an exemplary computing environment in which aspects of the computing environment may be implemented.

FIG. 1 shows an exemplary computing environment in which various aspects of the environment may be implemented. The computing system environment 100 is only one example of a suitable computing environment and is not intended to suggest any limitation as to the scope of use or functionality of the computing system environment. Neither should the computing environment 100 be interpreted as having any dependency or requirement relating to any one or combination of components illustrated in the exemplary operating environment 100.

The system is operational with numerous other general purpose or special purpose computing system environments or configurations. Examples of well known computing systems, environments, and/or configurations that may be suitable for use with the system include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The claims-based identity model may be described in the general context of computer-executable instructions, such as program modules, being executed by a computer. Generally, program modules include routines, programs, objects, components, data structures, etc. that perform particular tasks or implement particular abstract data types. The claims-based identity model may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the the claims-based identity model includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable storage media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137.

Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
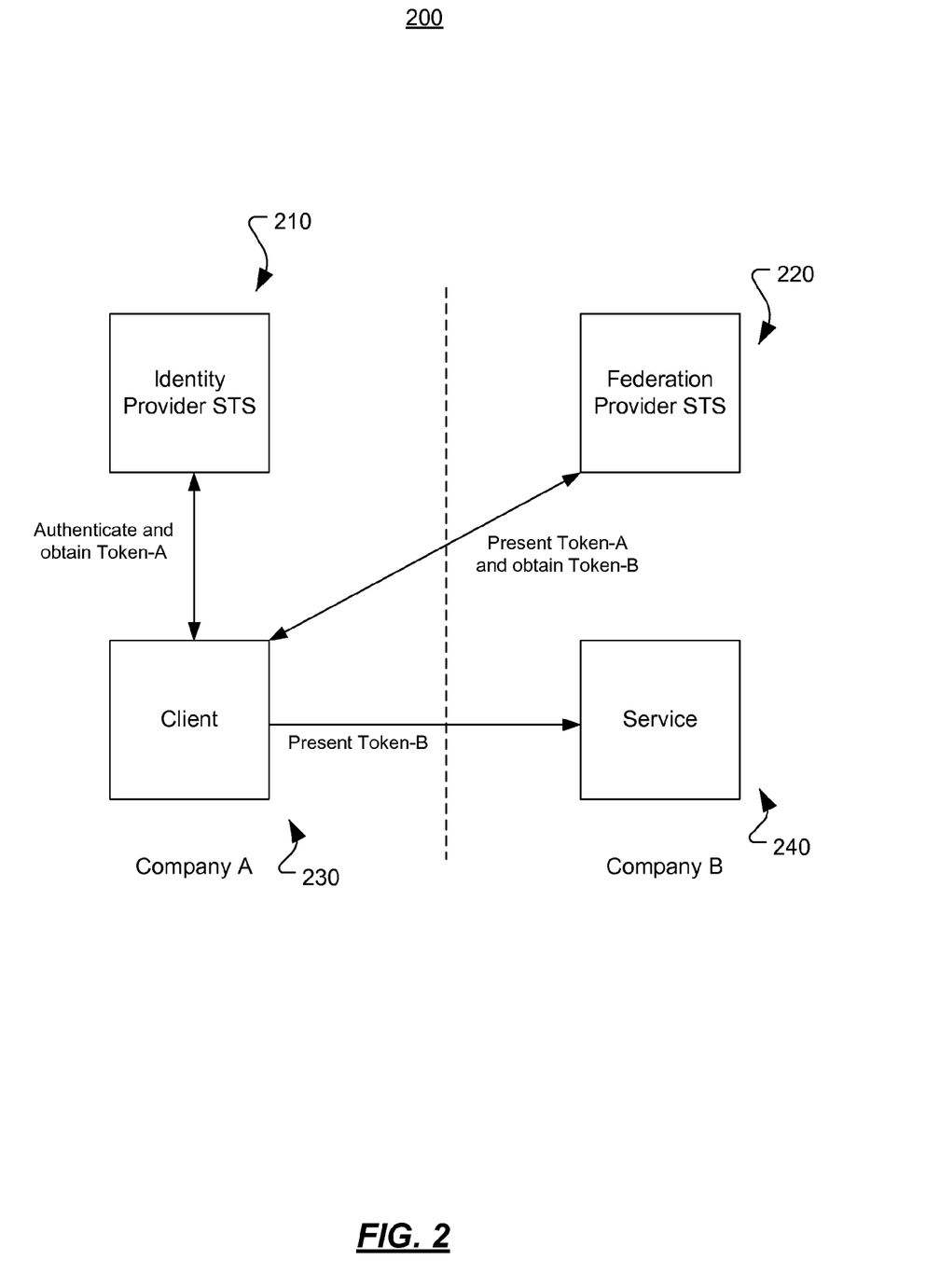
FIG. 2 is a block diagram of an exemplary federated model.

FIG. 2 is a schematic block diagram of a federated model. The federated model 200 provides a framework in which users use the same or similar user names to access resources across multiple networks. As illustrated in FIG. 2, the federated model 200 includes Identity Provider Security Token Service (STS) 210, Federation Provider STS 220, Client 230 and Service 240. FIG. 2 is an exemplary illustration of the flow of messages in a federated system.

According to some embodiments, a user (not shown) via the Client 230 authenticates their identity with the Identity Provider STS 210. The authentication process may be determined by the Identity Provider STS 210. One of ordinary skill in the art can appreciate that the credentials provided to the Identity Provider STS 210 may be platform specific and not intended to be limited to any particular format. Upon authentication of the client's credentials, the Identity Provider STS 210 issues a token (Token-A) to the Client 230. Token-A indicates the users level access and authentication. Token-A may be a security assertion markup language (SAML) token. The Client 230 sends the token the Federation Provider STS 220. Upon recite of Token-A, the Federation Provider STS evaluates the claims made by Token-A and determines whether the Client 230 can assess the resources located on the Federation Provider STS 220. If the Federation Provider STS 220 properly authenticates the token, the Federation Provider STS issues Token-B to the Client 230. Token-B indicates the authentication that is required by the Service 240. Upon receipt of Token-B, the Client 230 presents Token-B to the Service 240, and upon authentication of Token-B, a user at Client 230 may have access to the resources of 240. Underneath, the federation data model is the entity-relationships in a claims-based security model. This will be discussed in greater detail with regards to FIG. 3.

Figure 3:
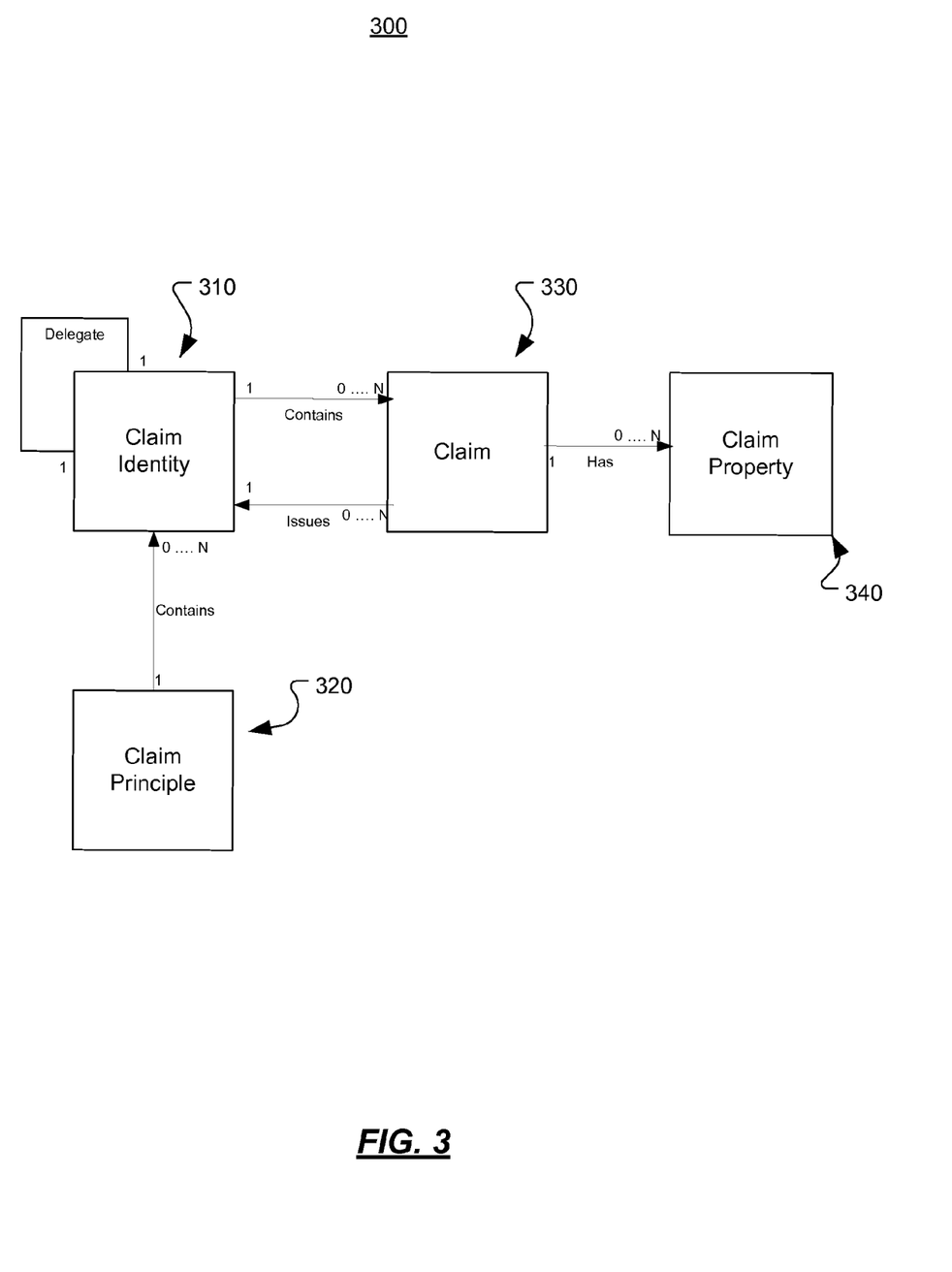
FIG. 3 data model illustrating the operating relationship between various elements of the data model.

FIG. 3 is a schematic block diagram of the entity-relationships of data model 300. The data model 300 illustrates the operating relationships between elements of the claims-based security model. The data model 300 actualizes a security framework in which claims are used to represent a security identity. A security identity may be one or more claims made by a subject about itself or another subject. In some embodiments described herein, the data model 300 may operate in a .NET environment. However, one of ordinary skill in the art would recognize that the data model is not confined to a specific environment. In prior art systems, security identities were maintained in SAML and Kerberos tokens. In some embodiments described herein, data model 300 treats security identity in terms of entities, issuers and claims. Claims are declarations made by an entity. For example, a claim could declare to a Bank application server that Bob has the privilege access to specific financial records. In this example, Bob would be considered an entity, and Bob's identity would be characterized by the claim that was made by a trusted entity containing the declaration that the entity represented by this claim has the privilege to access financial records. One of ordinary skill in the art can appreciate that the above example is for illustrative purposes only and is not meant in any way to limit the embodiment.

In some embodiments described herein, a declaration is a statement that contains an attribute made about the entity. These attributes may be name-value pairs, where the value is data or information and the name may be a universal-resource identifier. In some embodiments described herein, the attribute values have a string form in the .NET environment. The string attribute value may be seen as a serialization of the attribute value into the string form (for example, a string representation of an XML element or XML Schema). The claim may be represented (by a serialization process) into security tokens for transmission between domains.

As can be seen from FIG. 3, in some embodiments described herein, the elements of the model 300 consists of the claim identity 310, the claims principal 320, the claim 330 and the claim properties 340. The inter-relation between these elements has the effect of making the claim self-contained. No extrinsic information will be required in order to access all the relevant identity information when faced with a claim.

The claim identity 310 is a representation of the entity. Table 1 is an exemplary representation of the claim identity 310 object:

```
public interface IClaimsIdentity : IIdentity
{
    ICollection<Claim> Claims
    {
        get;
    }
    IClaimsIdentity Delegate
    {
        get;
    }
    string Label
    {
        get;
    }
}
```

The claims principal 320 is a representation of the identity or identities of callers to the application code in order for the application code to make correct identity related decisions. Table 2 is an exemplary representation of the claims principal 320 object:

```
public Interface IClaimsPrincipal : IPrincipal
{
    ICollection<IClaimsIdentity> Identities
    {
        get;
    }
}
```

In some embodiments described herein, the claims principal 320 represents the caller's entity security information to the application code in order for the application code to make identity-related decisions. The claims principal320 presents the claims identity or identities to the application code in a manner similar to IPrincipal class in the .NET framework. One of ordinary skill in the art can recognize that if there are multiple entities acting in different roles associated with the request, then a single claim principal 320 presented to the application code will contain multiple claim identities 310.

The claim 330 is the representation of the declaration made by an entity or entities. Table 4 is an exemplary representation of the claim 330 structure:

```
public class Claim
{
    public string Type
    {
        get;
    }
    public string Value
    {
        get;
    }
    public string ValueType
    {
        get;
    }
    public IClaimsIdentity Issuer
    {
        get;
    }
    public IClaimsIdentity Subject
    {
        get;
    }
    public IDictionary<string, string> Properties
    {
        get;
    }
}
```

In some embodiments described herein, the claim properties 340 allow metadata to be associated with the declaration stored in claim 330. The example of a claim property 340 would an identifier of the claim value verification entity or when that verification expires.

In some embodiments described herein, there are fields associated with the claims identity 310, claim 330, claim property 340 and claims principal 320. The claim 330 may comprise the following fields: claim type, claim value, claim value type, properties collection, issuer and subject (not shown). In some embodiments described herein, the claims identity 310 may comprise the following fields: Claims Collection, Label and Delegated Identity (not shown). The claims principal 320 may comprise the following field, Identities collection (not shown). One of ordinary skill in the art can appreciate that the various fields may be implemented in a string form, although other representations of the fields may be possible.

As shown in FIG. 3, the entity-relationship diagram describes the relationships between the principal elements of the data model. The claim 330 has a direct relationship to the claims identity 310 and the claim property 340. The claims identity 310 may have a direct relationship with the claim 330 and the claims principal 320. A claim 330 may contain a plurality (0 . . . N) claim identities 310. Also, a plurality of claims 330 may be issued by a claim identity 310. A claim 330 may have a plurality of claim properties 340. Also, the claims principal 320 may contain plurality of claim identities.

The claims identity 310 may possess zero or more claims 330 and may delegate zero to one claim identity 310. Delegation will be discussed in greater detail with regards to FIG. 4. As stated above, the claims identity 310 is also used to represent the entity that issues the claims. In some embodiments described herein, the claims are self containing with respect to the information that the claims relates to. No additional data need to be communicated to understand the claims contents, the relationship between the claim and entity that the claim refers and the relationship between the entity or entities that issues the claim.

The data model 300 describe the relationships between the primary entities of the claims-based identify system. However, an important element in the claim-based identity system is when one entity acts as another entity. This is called identity delegation.

Figure 4:
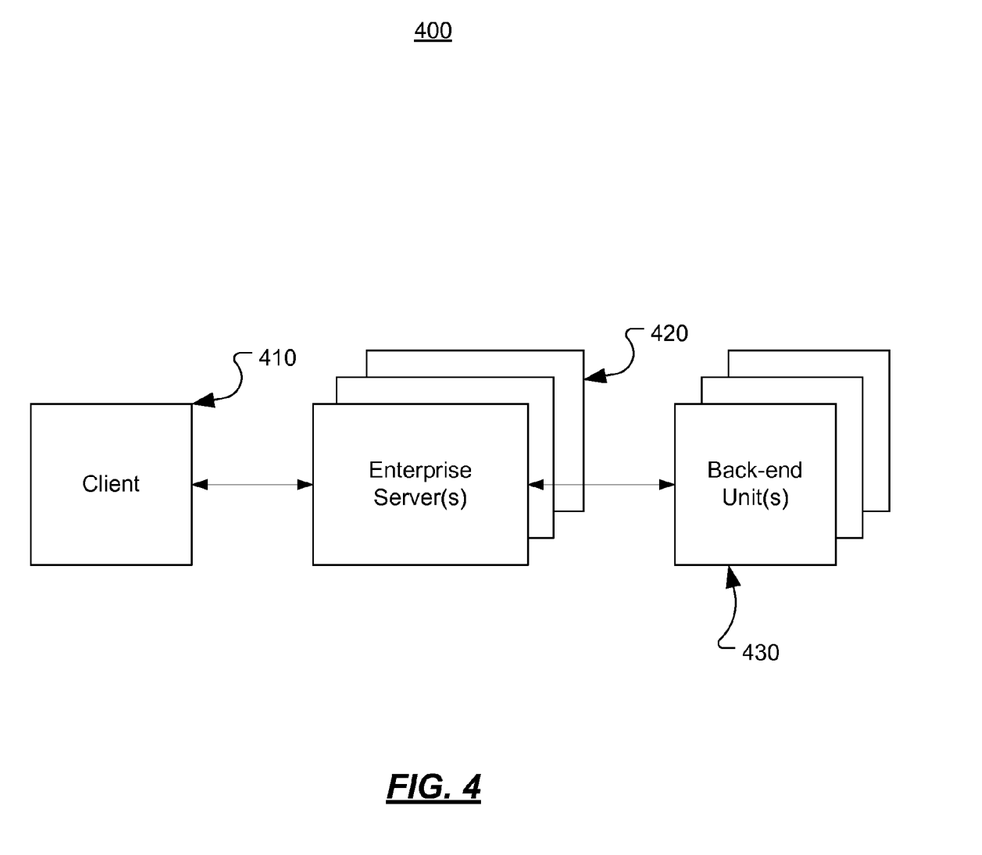
FIG. 4 is block diagram of an exemplary platform environment in which aspects of the claim based security model may be implemented.

FIG. 4 is a block diagram 400 of an exemplary operation of the delegation system. The block diagram includes a client 410, enterprise server(s) 420 and back-unit(s) 430. In some embodiments described herein, firewalls or other known security devices (not shown) authorize access to the at least one enterprise server 420 and to the at least one database 430. A user of the client would use known security methods to access the enterprise server(s) 420 (e.g., tokens, username/password and other known methods). In some embodiments described herein, claim serialization may be used as to transmit the claims between the client 410, enterprise server(s) 420 and between enterprise server(s) 420 and back-end unit 330. For example, the claims could be converted into tokens and transmitted between elements.

In the identity delegation system, the enterprise server(s) 420 may act as the original requester (client) when it accesses the back-end unit(s) 430 in order to fulfill the client's request. In some embodiments described herein, a trusted third party requester (not shown) may also act as the original requester. In this case, the client 410 would inquire with the trusted third party requestor to issue claims in its behalf. The third party requestor would authorize the identity of the client 410 and issue claims on behalf of the client. In some embodiments described herein, the claim processing service at the back-end unit(s) 430 may be able to distinguish the entities by looking at delegate property of the caller's identity. The model 400 described here allows both the identity of the original caller (client, 410) and the identity of the intermediary processing unit (enterprise server(s) 420) to be visible to the back-end processing unit(s) 330. In some embodiments described herein, the original caller's identity (client 310) may be in the top-most claims identity, the individual intermediary identities will be chained from the original caller's identity in the same order in which the call traversed through the intermediaries.

Referring back to FIG. 3, the structure delegate is present in order to represent this delegation of identity (or entity) in the data model 300. Table 1 is also an exemplary representation of entity structure:

```
public interface IClaimsIdentity : IIdentity
{
    ICollection<Claim> Claims
    {
        get;
    }
    IClaimsIdentity Delegate
    {
        get;
    }
    string Label
    {
        get;
    }
}
```

Figure 5:
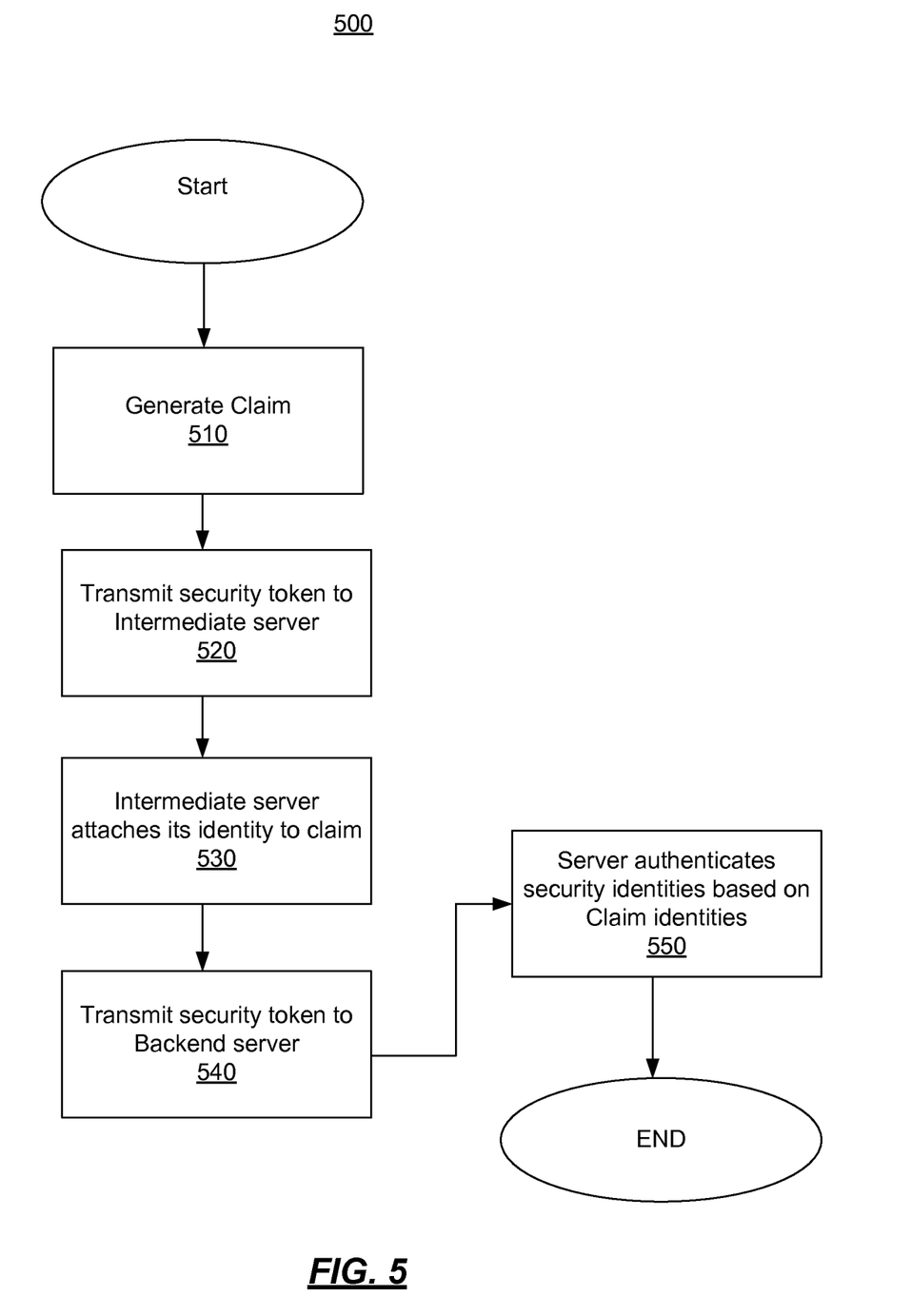
FIG. 5 is a flow diagram depicting a method that can be used with a claim based security model Like reference numerals are used to designate like parts in the accompanying drawings.

FIG. 5 is a flow diagram depicting a method 500 that may be used. Execution of the method 500 begins at the claims generated block 510 and continues to the server authenticates based on the claims at identity block 550. At process block 510, a set of claims representing the client is generated using the data model described with regards to FIG. 3. In accordance with the data model described with regards to FIG. 3, the each claim in the set of claims is associated with a particular identity which indicates the entity making the declaration by the claim issuer. In some embodiments described herein, once the set of claims have been generated by the issuer, the claims are packaged together—usually in form of a security token, such as (SAML) and sent to the client. As stated above with regards to FIG. 4, the set of claims may be issued by a trusted third party (not shown). The trusted third party would authentic the identity of the client and issue claims on its behalf. In some embodiments described herein, the client then transmits the packaged claims to an intermediary processing unit as shown in processing block 520. One of ordinary skill in the art would recognize that other transmission methods are possible and this is not meant to limit the scope of the method. The security token is received by an intermediary processing unit and converted by it to a claims identity with a set of claims using a well known process.

At process block 530, the intermediary processing unit, before talking to the back-end unit, needs to obtain packaged claims (e.g. security token) issued by a claim issuer that is trusted by the back-end unit. In some embodiments described herein, the intermediary unit transmits both its identity and the client's identity to the claims issuer. The claims issuer transforms and combines the information from both identities and sends back to the intermediary unit a packaged set of claims—security token—representing both the intermediary unit and the client's identities in a proper relationship (client calling via intermediary unit) forming the identity delegation chain information. One of ordinary skill in the art recognizes that the method is not limited to a single processing unit but instead if there is a plurality of processing units, then each processing unit will be added as another identity into the identity delegation chain by the corresponding claims issuer. In processing block 440, the intermediate server would then transmit the security token to a backend processing unit. In some embodiments described herein, the backend processing unit or database receives the security token and converts the security token into a claims identity. The identity of the client, as well as, the identity of the intermediate server is visible to the backend processing unit—the client's identity will be represented by the top-most identity given to it, the intermediary unit identity will be attached to the client's identity using the delegate property on the client's identity. At processing block 450, the backend server may make decisions regarding security as a result of the identity of both the intermediate server and the client.

In this example, the method chained together the identities of the client and the intermediate server. Those of ordinary skill in art can appreciate the fact the method may chain together a plurality of intermediate servers before reaching the backend processing unit. In this case, the identities of the client and the plurality of intermediate servers would be visible to the backend processing unit.

As stated above, in some embodiments described herein, the data model 300 may exist on a .NET platform. One of ordinary skill in the art can recognize that the data model is not limited to a .NET platform but may also apply to other platforms such as JAVA for example. The data model 300 is configured to be integrated into the existing .NET identity model and can be adopted by the existing .NET applications without any further coding or adjusting of the application's code. In Table 5, is an exemplary representation of C# pseudo code demonstrating the integration of the data model 300 into .NET.

```
public interface IClaimsIdentity : IIdentity
{
    ClaimCollection Claims { get; }
    IClaimsIdentity Delegate { get; }
    string Label { get; }
    bool Exists( Predicate<Claim> predicate );
}
public interface IClaimsPrincipal : IPrincipal
```

-continued

```
{
    ClaimsIdentityCollection Identities { get; }
}
public class ClaimCollection : IList<Claim>
{
    public virtual bool Exists( Predicate<Claim> match );
    public virtual ICollection<Claim>
    FindAll( Predicate<Claim> match );
}
public class ClaimsIdentitycollection : IList<ClaimsIdentity>
{
}
public class ClaimsIdentity : IClaimsIdentity
{
    // Implementation of the IClaimsIdentity members goes here
}
public class ClaimsPrincipal : IClaimsPrincipal
{
    // This is needed for now to enable access to the caller's identity in WCF
    // and in ASP.NET for existing authentication types
    public static ClaimsPrincipal Current { get; }
    // Implementation of the IClaimsPrincipal members goes here
}
public class WindowsClaimsIdentity : WindowsIdentity, IClaimsIdentity
{
    public WindowsClaimsIdentity( WindowsIdentity identity );
    // Implementation of IClaimsIdentity and WindowsIdentity
    members goes here
}
```

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A system comprising:
    processing unit; and
    computer storage media storing computer-readable instructions that cause the processing unit to execute a claims model that includes:
        a claim principal data object that implements a claim principal interface, wherein the claim principal data object is configured to represent security information about a user's attributes to a receiving application;
        a claim data object configured to represent a declaration about the user issued by an entity; and,
        a claim identity data object that implements a claim identity interface, wherein the claim identity data object is configured to represent an identity of the entity that issued the declaration about the user, wherein the claims model is configured to abstract the receiving application from a federated authentication mechanism used to authenticate the user,
        wherein the claim principal interface and the claim identity interface are different interfaces.

2. The system of claim 1, wherein the declaration relates to an individual attribute relating to the user.

3. The system of claim 1, wherein the declaration relates to multiple attributes relating to the user.

4. The system of claim 1, wherein the declaration relates to multiple attributes relating to the user issued by the entity and the claim data object is further configured to represent another declaration that relates to multiple other attributes relating to the user issued by another entity.

5. The system of claim 4, wherein the claim identity data object is configured to represent an identity of the another entity that issued the another declaration about the user.

6. The system of claim 1, the claims model further comprising an identity delegation field configured to describe a relationship between the user and the entity that issued the declaration about the user.

7. The system of claim 1, wherein the claims model further includes at least one claim property data object configured to represent metadata associated with the declaration.

8. The system of claim 1, wherein the claim principal data object, the claim data object, and the claim identity data object collectively comprise a claim, and wherein the system is further configured to generate a security token from the claim.

9. A system comprising:
processinq unit; and
computer storage media storing computer-readable instructions that cause the processing unit to generate a claim that includes:
at least one claim principl object that represents security information about attributes of a subject;
at least one claim data object that represents first individual declarations about the attributes issued by a first entity and second individual declarations about the attributes issued by a second entity other than the first entity;
a first claim identity data object that represents an identity of the first entity that issued the first individual declarations; and,
a second claim identity data object that represents an identity of the second entity that issued the second individual declarations.

10. The system of claim 9, wherein the computer-readable instructions cause the processing unit to:
provide the claim to a service requested by the subject.

11. The system of claim 9, wherein the computer-readable instructions cause the processing unit to:
provide the claim to the subject, wherein the claim entitles the subject to access a service.

12. The system of claim 9, wherein the at least one claim data object comprises a first data object representing the first individual declarations and a second data object representing the second individual declarations.

13. The system of claim 12, wherein:
the first data object includes a first issuer field identifying the first entity and a first subject field identifying the subject, and
the second data object includes a second issuer field identifying the second entity and a second subject field identifying the subject.

14. A method performed by at least one computing device, the method comprising:
obtaining a claim comprising:
a claim principal data object that implements a claim principal interface, wherein the claim principal data object represents security information about a subject;
a claim data object representing a declaration about the subject issued by an issuing entity; and,
a claim identity data object that implements a claim identity interface, wherein the claim identity data object represents an identity of the issuing entity that issued the declaration about the subject; and
authenticating the subject to a service by providing the claim to the service,
wherein the claim principal interface and the claim identity interface are different interfaces.

15. The method of claim 14, wherein the claim principal interface defines an identities collection property of the claim principal data object, the identities collection property comprising multiple other claim identity data objects that also implement the claim identity interface.

16. The method of claim 14, wherein the claim identity interface defines a claims collection property of the claim identity data object, the claims collection property comprising multiple other claim data objects.

17. The method of claim 14, wherein the claim identity interface identifies a delegate property of the claim identity data object, the delegate property attaching an identity of an intermediary entity to the claim identity data object, wherein the intermediary entity is not the subject and is not the issuing entity.

18. The method of claim 14, wherein the obtaining the claim comprises generating the claim.

19. The method of claim 18, wherein the providing the claim to the service comprises serializing the claim into a token and transmitting the token to the service.

* * * * *